May 19, 1970  B. L. SNYDER  3,513,048
METHOD FOR MAKING A PATCH STRUCTURE FOR FABRICS
Filed July 28, 1966

INVENTOR,
Benjamin L. Snyder,
BY
ATTORNEY.

United States Patent Office 3,513,048
Patented May 19, 1970

3,513,048
METHOD FOR MAKING A PATCH STRUCTURE FOR FABRICS
Benjamin L. Snyder, Union, N.J., assignor to Pentapco, Inc., Elizabeth, N.J., a corporation of New Jersey
Filed July 28, 1966, Ser. No. 568,650
Int. Cl. B32b 35/00
U.S. Cl. 156—98    4 Claims

ABSTRACT OF THE DISCLOSURE

A thermoplastic film piece is bonded onto the back of the damaged fabric to cover the hole, and another is bonded onto the back of a fabric piece which is to be used to repair the hole. A round hole is made in the plastic backed area of the torn member so the damage hole is in the cut-out. A round disc is cut out of the plastic-backed repair piece, for insertion as a plug into said round hole. On the back of the assembly, a thermoplastic film is bonded to the plastic backings of the assembled parts and a thin cotton fabric piece is bonded to the last-mentioned film. Since the plastic films are applied to cover the damage and to cover the patch, before cutting the fabric pieces, there is no fraying.

---

The present invention relates to patch making for the repair of holes occurring in garments or cloth articles because of pieces thereof being torn out, burnt out or worn out, or the patch may be a decorative inlay.

The principal object of this invention is to provide a novel and improved method to patch fabrics and the like, utilizing thermoplastic film serving as heat-sealing adhesive to effect a secure juncture. When the fabric has a design, this invention affords easy matching up of the patch piece and the fabric body proper, and in all events makes a patch of such fine fit that most times it is hardly discernible.

Another object thereof is to provide a method for patch construction, requiring simple implements and ready available supplies. Said construction and method are simple, inexpensive and efficiently do the work required of them herein. The resulting patch structure is frayless.

Other objects and advantages will become apparent as this disclosure proceeds.

For one practice of this invention, a thermoplastic film piece is bonded onto the back surface of the fabric member so the hole is covered thereby. A thermoplastic film piece is bonded onto the back surface of a fabric piece which is to be used to repair the hole. A round hole is made in the plastic-backed area of the torn member so the damage hole is included in the cut out. A round disc is cut out of the plastic-backed repair piece. This disc is inserted as a plug in said round hole. On the back of the assembly, a thermoplastic film is bonded to the plastic backings of the assembled parts. This overall plastic coat is covered by and bonded to a piece of thin cotton fabric.

The thermoplastic film supply serving as heat-sealing adhesive when subjected to heat and pressure, is preferably in sheet form on a backing of waxed paper which is releasable therefrom. A hand pressing iron is used to apply the plastic coatings in the patch structure. The round hole and plug disc are preferably cut out with a tubular die.

A more detailed description of this patch construction and the manner of making it, will now be set forth, for which I shall refer to the accompanying drawing forming part of this specification. In this drawing, similar characters of reference indicate corresponding parts in all the views.

FIG. 1 shows the front surface of a part of a garment or other fabric item having a hole which is to be repaired. The fabric shown is pin-striped on front and blank on its back.

FIGS. 2 and 3 show wax-paper-backed thermoplastic film discs used in the making of the patch structure. The paper backing can be easily stripped from the film it carries, and is commonly called a release paper or a strip sheet. For illustrative purposes, a marginal part of the release papers are shown separated from their associated film.

Figure 1:
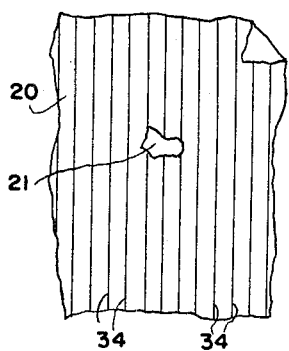
Figures 2, 3:
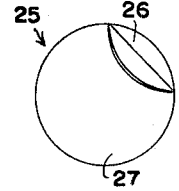
Figure 4:
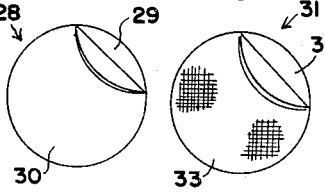
FIG. 4 is a view like FIG. 2, showing a plastic film on a thin cotton fabric backing. This disc is also used in the patch structure.
Figure 5:
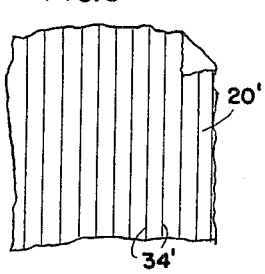
FIG. 5 shows the front surface of a fabric piece of the same material as FIG. 1, from which a disc is to be cut to plug a round hole to be made in the item to be repaired.

In the preferred showing of the practice of this invention as set forth in the drawing, the numeral 20 designates fabric material having a damage hole 21 which needs repair by a patch. The tools used therefore are a tubular die 22 to cut discs, which is the preferred shape, and a heated pressing iron 23 to bond thermoplastic film to fabric, and film to film. Supplies, for making the patch structure indicated generally by the numeral 24, consist of a piece of fabric 20' of the same kind as 20, a disc 25 comprising a thermoplastic film 26 on a release paper backing 27, a similar disc 28 whose thermoplastic film is numbered 29 and its release paper is 30, and a third disc 31 composed of a thermoplastic film 32 on a thin cotton fabric backing 33. The diameter of the die 22 is large enough to encompass the hole 21. The discs 25, 28, 31 are preferably of the same diameter for economy in manufacture, and of course are larger than the hole cut by the die 22.

All thermoplastic film material herein mentioned is or course pliable and heat-sealable. One suggested composition thereof is a modified polymer thermoplastic vinal film adhesive, as is well known in the art of thermoplastic adhesive tapes and the like.

Figures 6, 7, 8:
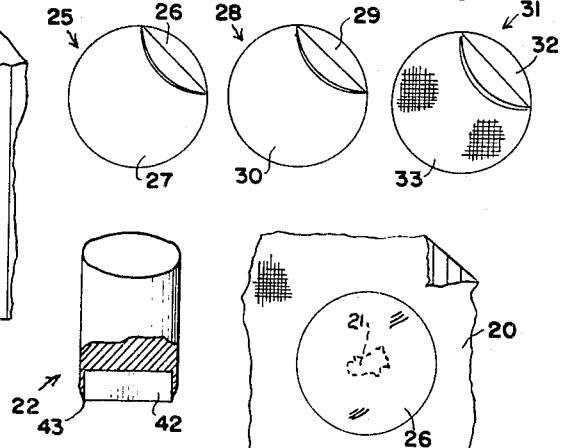
FIG. 6 is a perspective view, partly in section, of a disc-cutting die.
FIG. 7 shows the back of the fabric of FIG. 1, and illustrates the first step in making the repair.
FIG. 8 shows the back of the fabric piece of FIG. 5, and illustrates the second step in making the repair.
Figure 9:
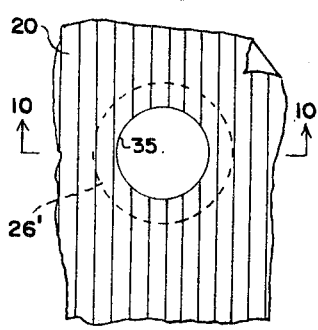
FIG. 9 is a front view of FIG. 7, showing the hole made therein with said die, as the third step in making the repair.
Figure 10:
FIG. 10 is an enlarged section taken at line 10—10 in FIG. 9, and includes the assembly shown in FIG. 8 laid under the assembly shown in FIG. 9, preparatory to perform the third step of aligning the designs of both fabric pieces before cutting the patch plug.
Figure 11:
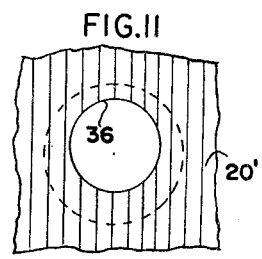
FIG. 11 is a front view of FIG. 8, showing the hole made by the patch plug cut therefrom with said die, which was the fourth step.
Figure 12:
FIG. 12 is a front view of said patch plug.
Figure 13:
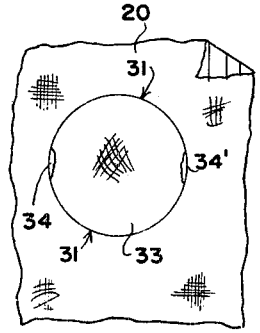
FIG. 13 shows the back of FIG. 9, and illustrates the fifth step in making the repair.
Figure 14:
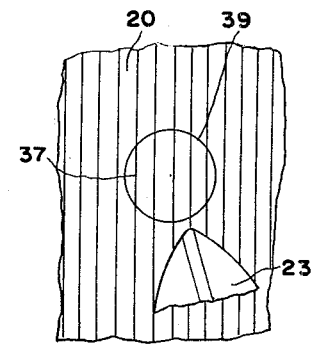
FIG. 14 shows the front of FIG. 13, and includes the patch plug inserted in place, ready to be bonded to complete the final step.
Figure 15:
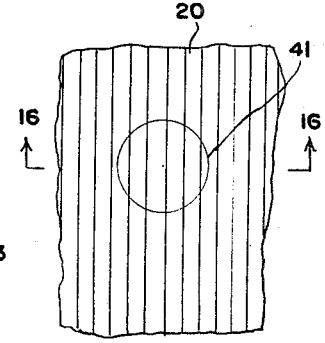
FIG. 15 is like FIG. 14, showing the work completed.
Figure 16:
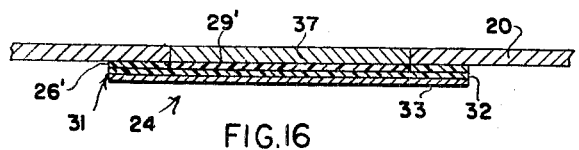
FIG. 16 is an enlarged section taken at line 16—16, showing the completed work.

To make the patch structure 24, set the disc 25 with its plastic ply 26 against the back surface of the fabric 20, so the damage hole 21 is covered thereby and is substantially centrally thereof. Then apply the hot iron 23 onto the release paper 27, so the plastic ply 26 will become bonded to the fabric 20. Thereupon remove the release paper 27, so the assembly is as shown in FIG. 7. Then set the disc 28 with its plastic ply 29 against the back surface of the fabric piece 20', and apply the hot iron onto the release paper 30, so the plastic ply 29 will become bonded to the fabric piece 20'. Thereupon remove the release paper 30, so the assembly is as shown in FIG. 8. Now use the die 22 to cut out a disc which includes the hole 21, substantially centrally thereof. This makes the hole 35 as shown in FIG. 9. Of course to do this, the die is set on the work and rapped with a hammer or mallet to cut through the layers 20 and 26. Now lay the assembly of FIG. 8, under the assembly of FIG. 9, with the front faces of the fabrics upward, and shift one with respect to the other to align the stripes 34 of fabric 20 with the stripes 34' of the fabric 20'. Then use the die 22 to cut the hole 36 shown in FIG. 11, by cutting through the layers 20' and 29, to yield the plastic-backed disc 37 of FIG. 12, which shall serve as the patch plug. Next set the disc 31 with its fabric backing 33 upward on the back of the fabric 20, to cover the hole 35 and the flat plastic ring 26', and apply the hot iron 23 at diametrically opposite regions so the disc 31 is tack-bonded at 34, 34' to the plastic ring 26', which is the condition shown in FIG. 13. The final step is to insert the plug 37 into the hole 35, in design alignment with the fabric 20, and apply the hot iron 23 to bond the plastic backing 29' on the plug 37, to the plastic 32 on the disc 31, and to bond the remainder of the plastic on said disc 31 to the plastic ring 26'. The patch structure is now complete as shown in FIGS. 15 and 16, and the damage is mended.

In all uses of the heated hand pressing iron 23, it is of course applied with pressure and held for a short period of time to soften the thermoplastic material to be bonded, and then the joint of plastic-to-plastic or plastic-to-fabric, as the case may be, is let cool and become set before dealing further with the work. It is advisable also to overlay the work with a thin pressing cloth not shown, for the ironing operations.

Of importance to note is that in the bonding of plastic film onto fabric, there occurs some impregnation of plastic into the fabric fibers, and thus immobilizes them against shifting and fraying. The exposed surface of the finished work mending a damage hole, appears as in FIG. 15, and in most instances, the plug's juncture line 41 is hardly discernable. Obliteration of this line also occurs to a very great extent when the fabric is relatively thick as for instance a woolen cloth, or one that has a nap. In all events, there is no parting line along said line 41, because of plastic which has seeped in therealong during the bonding operations.

All fabrics have a pattern which is determined by either the weave thereof no matter how simple, or by differently colored yarns in its makeup, or by print on the surface, and so the matching up of the pattern before cutting the plug 37, and in its subsequent insertion into the hole 35, is usually important for repair work. Even in solid color fabric, the weave pattern, regardless of its simplicity, should be matched usually, so that the plug is not positioned on the bias in relation to the fabric repaired.

It is readily understood without further illustration, that instead of repairing a damage hole included in a particular area, a fabric may have holes punched therein in a prescribed array in particular areas thereof, for plugs of different fabric, to serve as decorative inlays; such plugs being associated with the fabric body in accordance with the method described herein.

The plastic-faced repair discs 25, 28 and 31 may be other than circular, but the circular form is preferred in order to avoid sharp corners which might work loose during laundering. The die 22 is easiest to make if round, and may be fabricated from thin steel tubing stock, or as shown is made on a screw machine by providing a socket 42 in one end of a circular bar and sharpening the mouth rim edge 43 of such socket.

For the market, repair kits would comprise a supply of the discs with one die, or a number of dies of different sizes and a supply of different sized discs to suit. All plastic film used is preferably transparent so the discs will serve for fabrics of any color or combination of colors and thus aid in the obliteration of the line 41 from view. It is suggested that plastic film of a thickness of two mils be used, because I have found it suitable in all cases, and even on very thin fabrics will not seep through to mar or "shadow" the main fabric surface.

The use of the overall fabric backing 33, is highly protective to maintain the integrity of the patch structure generally, and particularly during laundering. The size of the backing disc 31 which has this fabric backing 33, may be larger than the disc 25, and overlap the plastic ring 26' in assembly.

This invention is capable of numerous forms and various manners and applications without departing from the essential features herein disclosed. It is therefore intended and desired that the specific showing herein shall be deemed merely illustrative and not restrictive and that the patent shall cover all patentable novelty herein set forth; reference being had to the following claims rather than to the specific description herein, to indicate the scope of this invention.

I claim:

1. The method for making a frayless patch construction to include a predetermined area of a fabric member, consisting of bonding a thermoplastic film backing crossing and surrounding said area, unto the back surface of said fabric member, whereby the fibers of said fabric covered by said film are immobilized, then cutting a piece of predetermined shape which includes said area therein, from said fabric member and the plastic backing thereon whereby a hole is made in the fabric member, then bonding a thermoplastic film backing into the back surface of a separate piece of fabric which is larger than said hole, whereby the fibers of said separate piece of fabric covered by the plastic film on said separate piece of fabric, are immobilized, then cutting from said separate fabric piece and its plastic backing, a piece which will exactly plug said hole when inserted therein, then fitting said plug into said hole so the plastic backings are coplanar, and then bonding a single thermoplastic film backing onto both said coplanar plastic backings.

2. The method as defined in claim 1, including bonding a fabric backing onto the exposed surface of said single plastic film.

3. The method as defined in claim 1, wherein the shape of the hole and of the plug, is circular.

4. The method as defined in claim 1, wherein the separate piece of fabric from which the plug is made, is identical with the fabric member in which the hole is made, and including the steps of matching the pattern of the plug before it is cut out with the fabric member and also upon insertion of said plug into the hole, before the single plastic film is bonded onto both said coplanar plastic backings.

References Cited

UNITED STATES PATENTS

| | | | |
|---|---|---|---|
| 1,113,030 | 10/1914 | McLaurin | 156—98 |
| 1,765,098 | 6/1930 | Roozendaal | 156—94 |
| 2,101,607 | 12/1937 | Block | 156—94 |
| 2,681,877 | 6/1954 | Seymour | 156—94 |
| 3,138,505 | 6/1964 | Hirsch | 161—113 |

DOUGLAS J. DRUMMOND, Primary Examiner

U.S. Cl. X.R.

161—113